US008002365B2

(12) United States Patent
Jacobsen et al.

(10) Patent No.: US 8,002,365 B2
(45) Date of Patent: Aug. 23, 2011

(54) CONFORMABLE TRACK ASSEMBLY FOR A ROBOTIC CRAWLER

(75) Inventors: Stephen C. Jacobsen, Salt Lake City, UT (US); Brian J. Maclean, Salt Lake City, UT (US); Ralph W. Pensel, Sandy, UT (US); Christopher R. Hirschi, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/985,324

(22) Filed: Nov. 13, 2007

(65) Prior Publication Data

US 2008/0217993 A1 Sep. 11, 2008

Related U.S. Application Data

(60) Provisional application No. 60/858,805, filed on Nov. 13, 2006.

(51) Int. Cl.
*B62D 55/14* (2006.01)
*B62D 55/065* (2006.01)

(52) U.S. Cl. ........ 305/129; 305/124; 305/132; 305/141; 180/9.44

(58) Field of Classification Search .................... 305/44, 305/47, 125, 129, 132, 133, 130, 131, 60; 180/9.44, 9.46
See application file for complete search history.

(56) References Cited

U.S. PATENT DOCUMENTS 1,107,874 A * 8/1914 Appleby ......................... 305/47
1,112,460 A * 10/1914 Ieavitt ........................... 180/9.5
1,515,756 A 11/1924 Roy
1,975,726 A 10/1934 Martinage
2,025,999 A 12/1935 Myers
2,082,920 A * 6/1937 Tye ............................... 305/132
2,129,557 A 9/1938 Beach
2,311,475 A 2/1943 Schmeiser
2,312,072 A 2/1943 Broadwater
2,329,582 A 9/1943 Bishop
2,345,763 A 4/1944 Mayne
2,701,169 A 2/1955 Cannon
2,850,147 A 9/1958 Hill
2,933,143 A 4/1960 Robinson et al.

(Continued)

FOREIGN PATENT DOCUMENTS

CA 2512299 9/2004

(Continued)

OTHER PUBLICATIONS

Arnold, Henry, "Cricket the robot documentation." online manual available at http://www.parallaxinc.com, 22 pages.

(Continued)

*Primary Examiner* — Russell D Stormer
(74) *Attorney, Agent, or Firm* — Thorpe North & Western LLP

(57) ABSTRACT

A suspension system for a lightweight robotic crawler is disclosed. The suspension system provides for mounting of a flexible endless track thereon. The suspension system includes a forward guide and a rearward guide around which the endless track can be looped. A deflector positioned between the forward guide and the rearward guide downwardly deflects a ground-engaging portion of the endless track to form a peaked area. The peaked area can support the lightweight robotic vehicle allowing alteration of a distribution of load over the ground-engaging portion of the endless track with respect to a supporting surface.

19 Claims, 3 Drawing Sheets

40
12
18
14
46
44
20
42
16

U.S. PATENT DOCUMENTS 2,967,737 A 1/1961 Moore
3,037,571 A 6/1962 Zelle
3,060,972 A 10/1962 Aheldon
3,166,138 A 1/1965 Dunn, Jr.
3,190,286 A 6/1965 Stokes
3,215,219 A 11/1965 Forsyth et al.
3,223,462 A 12/1965 Dalrymple
3,266,059 A 8/1966 Stelle
3,284,964 A 11/1966 Saito
3,311,424 A 3/1967 Taylor
3,362,492 A * 1/1968 Hansen ........................ 180/9.62
3,387,896 A 6/1968 Sobota
3,489,236 A 1/1970 Goodwin
3,497,083 A 2/1970 Abdersib
3,565,198 A 2/1971 Ames
3,572,325 A 3/1971 Bazell et al.
3,609,804 A 10/1971 Morrison
3,650,343 A 3/1972 Helsell
3,700,115 A 10/1972 Johnson et al.
3,707,218 A 12/1972 Payne et al.
3,712,481 A 1/1973 Harwood
3,715,146 A 2/1973 Robertson
3,757,635 A 9/1973 Hickerson et al.
3,808,078 A 4/1974 Snellman et al.
3,820,616 A 6/1974 Juergens
3,841,424 A 10/1974 Purcell et al.
3,864,983 A 2/1975 Jacobsen
3,933,214 A 1/1976 Guibord et al.
3,934,664 A 1/1976 Pohjola
3,974,907 A 8/1976 Shaw et al.
4,051,914 A 10/1977 Pohjola
4,059,315 A 11/1977 Jolliffe et al.
4,068,905 A 1/1978 Black et al.
4,107,948 A 8/1978 Molaug
4,109,971 A 8/1978 Black et al.
4,132,279 A 1/1979 Van der Lende et al.
4,218,101 A 8/1980 Thompson
4,260,053 A 4/1981 Onodera
4,332,317 A 6/1982 Bahre et al.
4,332,424 A 6/1982 Thompson
4,339,031 A 7/1982 Densmore
4,393,728 A 7/1983 Larson et al.
4,396,233 A 8/1983 Slaght
4,453,611 A 6/1984 Stacy, Jr.
4,483,407 A 11/1984 Iwamoto et al.
4,489,826 A 12/1984 Dubson
4,494,417 A 1/1985 Larson et al.
4,551,061 A 11/1985 Olenick
4,589,460 A * 5/1986 Albee ........................... 152/170
4,621,965 A 11/1986 Wilcock
4,636,137 A 1/1987 Lemelson
4,646,906 A 3/1987 Wilcox, Jr. et al.
4,661,039 A 4/1987 Brenholt
4,700,693 A 10/1987 Lia et al.
4,706,506 A 11/1987 Lestelle
4,712,969 A 12/1987 Kimura
4,714,125 A 12/1987 Stacy, Jr.
4,727,949 A 3/1988 Rea et al.
4,736,826 A 4/1988 White et al.
4,752,105 A 6/1988 Barnard
4,756,662 A 7/1988 Tanie et al.
4,765,795 A 8/1988 Rebman
4,784,042 A 11/1988 Painter
4,796,607 A 1/1989 Allred, III et al.
4,806,066 A 2/1989 Rhodes et al.
4,815,319 A 3/1989 Clement et al.
4,815,911 A 3/1989 Bengtsson et al.
4,818,175 A 4/1989 Kimura
4,828,339 A 5/1989 Thomas et al.
4,848,179 A 7/1989 Ubhayakar
4,862,808 A 9/1989 Hedgcoxe et al.
4,878,451 A 11/1989 Siren
4,900,218 A 2/1990 Sutherland
4,909,341 A * 3/1990 Rippingale et al. ............ 180/9.1
4,924,153 A 5/1990 Toru et al.
4,932,491 A 6/1990 Collins, Jr.
4,932,831 A 6/1990 White et al.
4,936,639 A * 6/1990 Pohjola ......................... 305/133
4,977,790 A 12/1990 Nishi et al.
5,018,591 A 5/1991 Price
5,021,798 A 6/1991 Ubhayakar
5,022,812 A 6/1991 Coughlan et al.
5,046,914 A 9/1991 Holland et al.
5,080,000 A 1/1992 Bubic
5,130,631 A 7/1992 Gordon et al.
5,142,932 A 9/1992 Moya et al.
5,174,168 A 12/1992 Takagi et al.
5,174,405 A 12/1992 Carra et al.
5,186,526 A 2/1993 Pennington
5,199,771 A 4/1993 James et al.
5,205,612 A 4/1993 Sugden et al.
5,214,858 A 6/1993 Pepper et al.
5,219,264 A 6/1993 McClure et al.
5,252,870 A 10/1993 Jacobsen et al.
5,297,443 A 3/1994 Wentz
5,317,952 A 6/1994 Immega
5,337,732 A 8/1994 Grundfest et al.
5,350,033 A 9/1994 Kraft
5,354,124 A 10/1994 James
5,363,935 A 11/1994 Schempf et al.
5,386,741 A 2/1995 Rennex
5,413,454 A 5/1995 Movsesian
5,426,336 A 6/1995 Jacobsen et al.
5,428,713 A 6/1995 Matsumaru
5,435,405 A 7/1995 Schempf et al.
5,440,916 A 8/1995 Stone et al.
5,443,354 A 8/1995 Stone et al.
5,451,135 A 9/1995 Schempf et al.
5,465,525 A 11/1995 Mifune
5,466,056 A 11/1995 James et al.
5,469,756 A 11/1995 Feiten
5,516,249 A 5/1996 Brimhall
5,551,545 A 9/1996 Gelfman
5,556,370 A 9/1996 Maynard
5,562,843 A 10/1996 Yasumoto
5,567,110 A 10/1996 Sutherland
5,570,992 A 11/1996 Lemelson
5,573,316 A 11/1996 Wankowski
5,588,688 A 12/1996 Jacobsen et al.
5,672,044 A 9/1997 Lemelson
5,697,285 A 12/1997 Nappi et al.
5,712,961 A 1/1998 Matsuo
5,749,828 A 5/1998 Solomon et al.
5,770,913 A 6/1998 Mizzi
5,816,769 A 10/1998 Bauer et al.
5,821,666 A 10/1998 Matsumoto et al.
5,842,381 A 12/1998 Feiten
RE36,025 E 1/1999 Suzuki
5,878,783 A 3/1999 Smart
5,888,235 A 3/1999 Jacobsen et al.
5,902,254 A 5/1999 Magram
5,906,591 A 5/1999 Dario et al.
5,984,032 A 11/1999 Gremillion et al.
5,996,346 A 12/1999 Maynard
6,016,385 A 1/2000 Yee et al.
6,030,057 A 2/2000 Fikse
6,056,237 A 5/2000 Woodland
6,107,795 A 8/2000 Smart
6,109,705 A 8/2000 Courtemanche
6,113,343 A 9/2000 Goldenberg et al.
6,132,133 A * 10/2000 Muro et al. .................. 404/102
6,138,604 A 10/2000 Anderson et al.
6,162,171 A 12/2000 Ng et al.
6,186,604 B1 2/2001 Fikse
6,203,126 B1 3/2001 Harguth
6,260,501 B1 7/2001 Agnew
6,263,989 B1 7/2001 Won
6,264,293 B1 7/2001 Musselman et al.
6,264,294 B1 7/2001 Musselman et al.
6,281,489 B1 8/2001 Tubel et al.
7,843,431 B2 11/2001 Robbins et al.
6,325,749 B1 12/2001 Inokuchi et al.
6,333,631 B1 12/2001 Das et al.
6,339,993 B1 1/2002 Comello et al.
6,380,889 B1 4/2002 Herrmann
6,394,204 B1 5/2002 Haringer
6,405,798 B1 6/2002 Barrett et al.

6,408,224 B1 6/2002 Okamoto et al.
6,411,055 B1 6/2002 Fujita et al.
6,422,509 B1 7/2002 Yim
6,430,475 B2 8/2002 Okamoto et al.
6,431,296 B1 8/2002 Won
6,446,718 B1 9/2002 Barrett et al.
6,450,104 B1 9/2002 Grant et al.
6,484,083 B1 11/2002 Hayward et al.
6,488,306 B1 12/2002 Shirey et al.
6,505,896 B1 1/2003 Boivin et al.
6,512,345 B2 1/2003 Borenstein et al.
6,523,629 B1 2/2003 Buttz et al.
6,529,806 B1 3/2003 Licht
6,540,310 B1 4/2003 Cartwright
6,557,954 B1 5/2003 Hattori
6,563,084 B1 5/2003 Bandy et al.
6,574,958 B1 6/2003 MacGregor
6,576,406 B1 6/2003 Jacobsen et al.
6,595,812 B1 7/2003 Haney
6,610,007 B2 8/2003 Belson et al.
6,619,146 B2 9/2003 Kerrebrock
6,651,804 B2 11/2003 Thomas et al.
6,668,951 B2 12/2003 Won
6,708,068 B1 3/2004 Sakaue
6,715,575 B2 4/2004 Karpik
6,772,673 B2 8/2004 Seto et al.
6,773,327 B1 8/2004 Felice et al.
6,774,597 B1 8/2004 Borenstein
6,799,815 B2 10/2004 Krishnan et al.
6,820,653 B1 11/2004 Schempf et al.
6,831,436 B2 12/2004 Gonzalez
6,835,173 B2 12/2004 Couvillon, Jr.
6,837,318 B1 1/2005 Craig et al.
6,840,588 B2 1/2005 Deland et al.
6,866,671 B2 3/2005 Tierney et al.
6,870,343 B2 3/2005 Borenstein et al.
6,917,176 B2 7/2005 Schempf et al.
6,923,693 B2 8/2005 Borgen et al.
6,936,003 B2 8/2005 Iddan
6,959,231 B2 10/2005 Maeda
7,020,701 B1 3/2006 Gelvin et al.
7,040,426 B1 * 5/2006 Berg .............................. 180/9.5
7,044,245 B2 5/2006 Anhalt et al.
7,069,124 B1 6/2006 Whittaker et al.
7,090,637 B2 8/2006 Danitz et al.
7,137,465 B1 11/2006 Kerrebrock et al.
7,144,057 B1 12/2006 Young et al.
7,171,279 B2 1/2007 Buckingham et al.
7,188,473 B1 3/2007 Asada
7,188,568 B2 3/2007 Stout
7,228,203 B2 6/2007 Koselka et al.
7,235,046 B2 6/2007 Anhalt et al.
7,331,436 B1 2/2008 Pack et al.
7,387,179 B2 6/2008 Anhalt et al.
7,415,321 B2 8/2008 Okazaki et al.
7,546,912 B1 6/2009 Pack et al.
7,600,592 B2 10/2009 Goldenberg et al.
7,645,110 B2 1/2010 Ogawa et al.
7,654,348 B2 2/2010 Ohm et al.
7,775,312 B2 8/2010 Maggio
7,860,614 B1 12/2010 Reger
2001/0037163 A1 11/2001 Allard
2002/0128714 A1 9/2002 Manasas et al.
2002/0140392 A1 10/2002 Borenstein
2003/0000747 A1 1/2003 Sugiyama et al.
2003/0069474 A1 4/2003 Couvillon, Jr.
2003/0097080 A1 5/2003 Esashi et al.
2003/0110938 A1 6/2003 Seto et al.
2003/0223844 A1 12/2003 Schiele et al.
2004/0030571 A1 2/2004 Solomon
2004/0099175 A1 5/2004 Perrot et al.
2004/0103740 A1 6/2004 Townsend et al.
2004/0168837 A1 9/2004 Michaud et al.
2004/0216931 A1 11/2004 Won
2004/0216932 A1 11/2004 Giovanetti et al.
2005/0007055 A1 1/2005 Borenstein
2005/0027412 A1 2/2005 Hobson et al.
2005/0085693 A1 4/2005 Belson et al.
2005/0107669 A1 5/2005 Couvillon, Jr.
2005/0166413 A1 8/2005 Crampton
2005/0168068 A1 8/2005 Courtemanche et al.
2005/0168070 A1 8/2005 Dandurand
2005/0225162 A1 10/2005 Gibbins
2005/0235898 A1 10/2005 Hobson et al.
2005/0235899 A1 10/2005 Yamamoto et al.
2005/0288819 A1 12/2005 de Guzman
2006/0000137 A1 1/2006 Valdivia y Alvarado et al.
2006/0005733 A1 1/2006 Rastegar et al.
2006/0010702 A1 1/2006 Roth et al.
2006/0070775 A1 4/2006 Anhalt et al.
2006/0156851 A1 7/2006 Jacobsen et al.
2006/0225928 A1 10/2006 Nelson
2006/0229773 A1 10/2006 Peretz
2007/0029117 A1 2/2007 Goldenberg et al.
2007/0156286 A1 7/2007 Yamauchi
2007/0193790 A1 8/2007 Goldenberg et al.
2007/0260378 A1 11/2007 Clodfelter
2008/0115687 A1 5/2008 Gal
2008/0164079 A1 7/2008 Jacobsen
2008/0168070 A1 7/2008 Naphade et al.
2008/0215185 A1 9/2008 Jacobsen et al.
2008/0272647 A9 11/2008 Hirose et al.
2008/0284244 A1 11/2008 Hirose et al.
2009/0035097 A1 2/2009 Loane
2009/0171151 A1 7/2009 Choset et al.
2010/0030377 A1 2/2010 Unsworth
2010/0201185 A1 8/2010 Jacobsen
2010/0317244 A1 12/2010 Jacobsen
2010/0318242 A1 12/2010 Jacobsen

FOREIGN PATENT DOCUMENTS

CN 1603068 A 4/2005
CN 2774717 4/2006
CN 1 970 373 5/2007
DE 3025840 2/1982
DE 3626238 A1 2/1988
DE 19617852 10/1997
DE 19714464 10/1997
DE 197 04 080 8/1998
DE 100 18 075 1/2001
DE 102004010089 9/2005
EP 0 105 418 4/1984
EP 0 818 283 1/1998
EP 0 924 034 6/1999
EP 1 510 896 3/2005
EP 1 832 501 9/2007
EP 1 832 502 9/2007
FR 2638813 5/1990
FR 2850350 7/2004
GB 1199729 7/1970
JP 52-57625 * 5/1977
JP 58-89480 * 5/1983
JP 60015275 A * 1/1985
JP 60047771 A * 3/1985
JP 60060516 4/1985
JP 60139576 A * 7/1985
JP 61-1581 * 1/1986
JP 61089182 5/1986
JP 63306988 A * 12/1988
JP 04092784 A * 3/1992
JP 05147560 A * 6/1993
JP 06-115465 * 4/1994
JP 03 535508 6/2004
JP 2005111595 4/2005
WO WO 97/26039 7/1997
WO WO 00/10073 2/2000
WO WO 02/16995 2/2002
WO WO 03/030727 4/2003
WO WO 03/037515 5/2003
WO WO 2005/018428 3/2005
WO WO 2006 068080 6/2006
WO WO 2008/049050 4/2008
WO WO 2008/076194 6/2008
WO WO 2008/135978 11/2008
WO WO 2009/009673 1/2009

OTHER PUBLICATIONS

Jacobsen, Stephen, U.S. Appl. No. 11/985,336, filed Nov. 13, 2007.

Jacobsen, Stephen, U.S. Appl. No. 11/985,346, filed Nov. 13, 2007.
Jacobsen, Stephen, U.S. Appl. No. 11/985,323, filed Nov. 13, 2007.
Jacobsen, Stephen, U.S. Appl. No. 11/985,320, filed Nov. 13, 2007.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, 2000, pp. 2079-2082, Japan.
Braure, Jerome, "Participation to the construction of a salamander robot: exploration of the morphological configuration and the locomotion controller", Biologically Inspired Robotics Group, master thesis, Feb. 17, 2004, pp. 1-46.
Jacobsen, et al., Advanced intelligent mechanical sensors (AIMS), Proc. IEEE Trandsucers, Jun. 24-27, 1991, abstract only, San Fransico, CA.
Jacobsen, et al., "Research robots for applications in artificial intelligence, teleoperation and entertainment", International Journal of Robotics Research, 2004, pp. 319-330, vol. 23.
Jacobsen, et al., "Multiregime MEMS sensor networks for smart structures," Procs. SPIE 6th Annual Inter. Conf. on Smart Structues and Materials, Mar. 1-5, 1999, pp. 19-32, vol. 3673, Newport Beach CA.
Maclean et al., "A digital MEMS-based strain gage for structural health monitoring," Procs. 1997 MRS Fall Meeting Symposium, Nov. 30-Dec. 4, 1997, pp. 309-320, Boston Massachusetts.
Berlin et al., "MEMS-based control of structural dynamic instability", Journal of Intelligent Material Systems and Structures, Jul. 1998 pp. 574-586, vol. 9.
Goldfarb, "Design and energetic characterization of a liquid-propellant-powered actuator for self-powered robots," IEEE Transactions On Mechatronics, Jun. 2003, vol. 8 No. 2.
Dowling, "Limbless Locomotion: Learning to crawl with a snake robot," The Robotics Institute at Carnegie Mellon University, Dec. 1997, pp. 1-150.
Jacobsen, Stephen, U.S. Appl. No. 12/171,144, filed Jul. 10, 2008.
Jacobsen, Stephen, U.S. Appl. No. 12/171,146, filed Jul. 10, 2008.
Jacobsen, Stephen, U.S. Appl. No. 12/151,730, filed May 7, 2008.
Jacobsen, Stephen, U.S. Appl. No. 12/117,233, filed May 8, 2008.
Jacobsen, Stephen, U.S. Appl. No. 11/293,701, filed Dec. 1, 2005.
Jacobsen, et al., U.S. Appl. No. 12/350,693, filed Jan. 8, 2009.
Ren Luo "Development of a multibehavior-based mobile robot for remote supervisory control through the internet" IEEE/ ASME Transactions on mechatronics, IEEE Service Center, Piscataway, NY, Dec 1, 2000, vol. 5, No. 4.
Nilas Sueset et al., "A PDA-based high-level human-robot interaction" Robotics, Automation and Mechatronics, IEEE Conference Singapore, Dec. 1-3, 2004, vol. 2, pp. 1158-1163.
Jacobsen, U.S. Appl. No. 12/694,996, filed Jan. 27, 2010.
U.S. Appl. No. 12/694,996, filed Jan. 27, 2010; Stephen C. Jacobsen; Office Action Issued Sep. 30, 2010.
U.S. Appl. No. 12/151,730, filed May 7, 2008; Stephen C. Jacobsen; Office Action Issued Nov. 15, 2010.
U.S. Appl. No. 12/171,144, filed Jul. 10, 2008; Stephen C. Jacobsen; Office Action Issued Aug. 11, 2010.
U.S. Appl. No. 11/985,324, filed Nov. 13, 2007; Stephen C. Jacobsen; Office Action Issued Nov. 1, 2010.
PCT/US10/38331; filed Jun. 11, 2009; Stephen C. Jacobsen; ISR Issued Dec. 1, 2010.
U.S. Appl. No. 12/820,881, filed Jun. 22, 2010; Stephen C. Jacobsen; office action issued Nov. 30, 2010.
U.S. Appl. No. 12/171,144, filed Jul. 10, 2008; Stephen C. Jacobsen; office action mailed Jan. 13, 2011.
U.S. Appl. No. 12/694,996, filed Jan. 27, 2010; Stephen C. Jacobsen; office action mailed Jan. 26, 2011.
PCT Application PCT/US2010/038339; filing date Nov. 6, 2010; Stephen C. Jacobsen; ISR mailed Sep. 2, 2011.
Matthew Heverly & Jaret Matthews: "A wheel-on-limb rover for lunar operation" Internet article, Nov. 5, 2008, pp. 1-8, http://robotics.estec.esa.Int/I-SAIRAS/Isairas2008/Proceedings/SESSION%2026/rn116-Heverly.pdf.
NASA: "Nasa's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.

* cited by examiner

CONFORMABLE TRACK ASSEMBLY FOR A ROBOTIC CRAWLER

RELATED APPLICATIONS

This application claims priority to U.S. Provisional Patent Application No. 60/858,805, filed Nov. 13, 2006 in the United States Patent and Trademark Office, and entitled, "Conformable Track Assembly For A Robotic Crawler," which application is incorporated by reference in its entirety herein.

FIELD OF THE INVENTION

The present invention relates to small, unmanned ground robotic vehicles. More particularly, the present invention relates to a suspension system for mounting a flexible endless track to support a lightweight robotic vehicle.

BACKGROUND OF THE INVENTION AND RELATED ART

Unmanned robotic vehicles can be deployed in a variety of applications and environments, including for example, search and rescue, military operations, and industrial operations. Unmanned robotic vehicles can help to avoid the need to expose humans to hazardous environments, such as unstable buildings, military conflict situations, and chemically, biologically, or nuclear contaminated environments.

Unmanned robotic vehicles face many challenges when attempting mobility. Terrain can vary widely, including for example, bumpy or smooth surfaces, firm or soft ground, loose and shifting materials, etc. For small robotic vehicles, the challenges become even greater. A vehicle optimized for operation in one environment may perform poorly in other environments.

The use of endless tracks are known to provide a good compromise which allows a robotic vehicle to accommodate a large variation in terrain types while maintaining relatively good traction and maneuverability. For example, tank-like vehicles using a pair of parallel endless tracks can provide high stability in some environments.

Tracked vehicles are typically steered using skid steering. In skid steering, the tracks on opposite sides of the vehicle are moved at different rates. Skid steering can be inefficient, as portions of the tracks move perpendicular to the direction of travel. There can be significant friction opposing this sideways motion. For longer tracks, greater force must be applied to overcome this friction. The inefficiency of skid steering also increases for tighter radius turns. The inefficiency of skid steering is at a peak when there is no net forward movement of the vehicle, only rotation around a central pivot point. A sharp turning radius can also result in significant stress on the vehicle suspension components due to the lateral movement. For lightweight robotic vehicles which tend to have limited drive power available, sharp turns may therefore be difficult or impossible to obtain.

SUMMARY OF THE INVENTION

The present invention includes a suspension system for a flexible endless track that helps to overcome problems and deficiencies inherent in the prior art. In one embodiment, the suspension system includes a frame, on which a forward guide, rearward guide, and at least one deflector are mounted. An endless track can be looped around the forward guide and rearward guide. The deflector downwardly deflects a ground-engaging portion of the endless track between the forward guide and the rearward guide to form a peaked area. The deflector is configured as a full load-bearing component capable of altering a distribution of load over the ground-engaging portion of the endless track with respect to a supporting surface.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Figure 1:
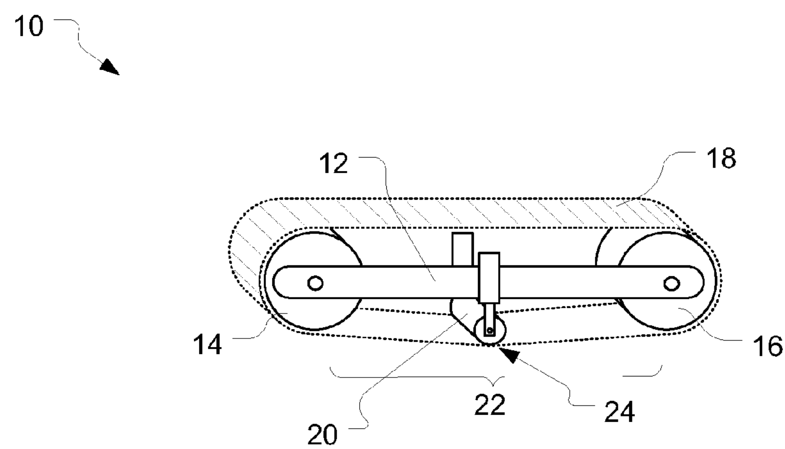
FIG. 1 illustrates a perspective view of a suspension system for mounting a flexible endless track according to an exemplary embodiment of the present invention.

With reference to FIG. 1, shown is an illustration of a suspension system for mounting a flexible endless track thereon to support a lightweight robotic vehicle according to a first exemplary embodiment of the present invention. Specifically, FIG. 1 illustrates the suspension system 10 as including a frame 12 having a forward guide 14 and a rearward guide 16 coupled thereto. An endless track 18 can be looped around the forward guide and the rearward guide. A deflector 20 is coupled to the frame between the forward guide and the rearward guide. The deflector downwardly deflects the ground-engaging portion 22 of the endless track to form a peaked area 24. The deflector is a load-bearing component, capable of supporting the lightweight robotic vehicle. The deflector is thus capable of altering a distribution of loading over the ground-engaging portion of the endless track with respect to a supporting surface. In other words, the deflector can be extended or retracted to cause different distributions of the weight of the robotic vehicle over the ground-engaging portion of the endless track. For example, the deflector can be extended to cause the weight of the robot to be substantially concentrated on the portion of the ground-engaging portion under the deflector. As another example, the deflector can be retracted to cause the weight of the robot to be distributed substantially over the entire ground-engaging portion of the endless track. Of course, various other weight distributions in between these extremes are also possible. The actual distribution of weight over the ground-engaging portion of the endless track will be a function of the amount of deflection of the deflector and the properties of the surface on which the lightweight robotic vehicle is operated. The orientation of the lightweight robotic vehicle can thereby be altered with respect to a supporting surface by operation of the deflector.

Figure 2:
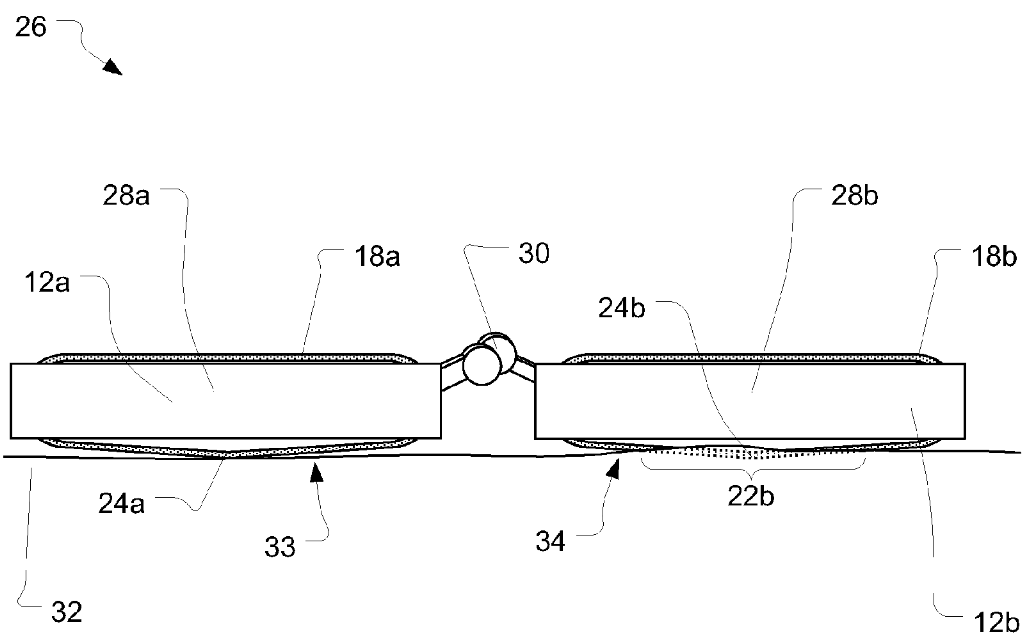
FIG. 2 illustrates a perspective view of a lightweight robotic vehicle having a suspension system in accordance with another embodiment of the present invention.

Operation of a lightweight robotic vehicle using a suspension system in accordance with an embodiment of the present invention will now be described. FIG. 2 illustrates an exemplary tandem configuration of a lightweight robotic vehicle 26 using two tracked units 28*a*, 28*b*, each having a suspension system 10 as described above. The tracked units are linked together by an articulated arm 30. For example, commonly-owned U.S. Non-provisional patent application Ser. No. 11/985,323, entitled, "Serpentine Robotic Crawler," filed Nov. 13, 2007 and incorporated in its entirety by reference herein, describes a serpentine robotic crawler in which the suspension system of the present invention can be used.

The lightweight robotic vehicle 26 is operated on a supporting surface 32. When operated over a firm area 33 of the supporting surface, the peaked area 24*a* of the endless track helps to support substantially all of the weight of tracked unit 28*a*. In contrast, when operated over a soft area 34 of the supporting surface, the peaked area 24*b* of the endless track will sink into the supporting surface, and the weight of tracked unit 28*b* is distributed over the ground-engaging portion 22*b* of the endless track. It will be appreciated that the operation of the endless tracks 18*a*, 18*b* and articulated arm 30 can be coordinated to maintain the lightweight robotic vehicle balanced on the peaked areas of the endless tracks.

When a lightweight robotic vehicle using the suspension system 10 is operated on a firm surface, the deflector lifts the lightweight robotic vehicle up so that most of the endless track is off the supporting surface. Hence, only the small area of the endless track near the peaked area 24 is in contact with the supporting surface. This helps to reduce friction when skid steering is performed, allowing for a tighter turning radius as compared to a conventional endless track, which provides a flat ground-engaging surface. Turning performing is accordingly more comparable to that of a wheeled vehicle than a tracked vehicle.

When the lightweight robotic vehicle is operated on a soft surface, a larger ground-engaging area of the endless track is in contact with the supporting surface. This provides better traction than a wheeled vehicle. Turning radius is not greatly reduced, however, as the soft surface provides relatively little friction to lateral movement of the track. Hence, the suspension system provides an improvement in turning radius over a conventional endless track on firm surfaces, while retaining the traction advantages of the endless track on soft surfaces.

Various alternate arrangements of the components of the suspension 10 are possible. Referring back to FIG. 1, the forward guide 14, rearward guide 16, and deflector 20 can be rollers rotatably mounted to the frame 12. The forward guide, rearward guide, and deflector can be mounted in fixed positions on the frame relative to each other, although this is not essential. Alternately, the forward guide, the rearward guide, or the deflector can be movable, for example to help maintain constant tension in the track.

The deflector 20 can also include a load-sensing element (not shown). For example, the load-sensing element can be a load cell, strain gauge, pressure sensor, or the like as is known in the art. During operation of the lightweight robotic vehicle, the deflector may support a varying portion of the lightweight robotic vehicle's weight, and thus a load-sensing element on the deflector can provide useful information for control of the lightweight robotic vehicle. For example, a lightweight robotic vehicle may be in a tank-like configuration where parallel endless tracks are disposed on each side of the vehicle. Each endless track can include a deflector and associated load-sensing element. When the vehicle is at risk of tipping sideways, the load sensed on one deflector will greatly exceed the other deflector. Corrective action can then be taken.

Figure 3:
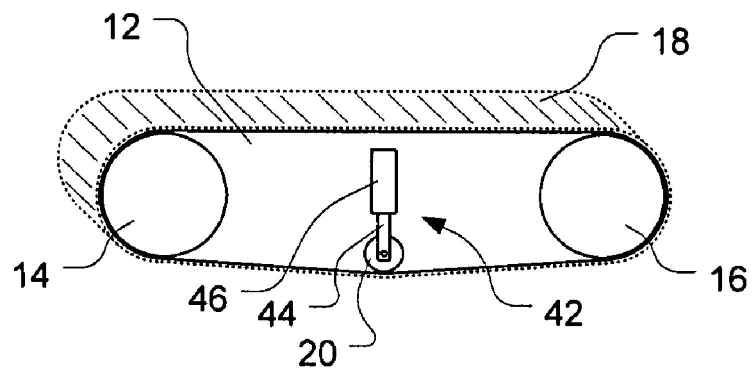
FIG. 3 illustrates a side view of a suspension system for mounting a flexible endless track according to another exemplary embodiment of the present invention.

In accordance with another embodiment of the present invention, as illustrated in FIG. 3, a suspension system 40 can include a moveable deflector assembly 42. For example, the deflector 20 can be mounted to a piston arm 44 that is driven up and down by hydraulic cylinder 46. This can allow the amount of downward deflection of the endless track to be adjusted during operation of the lightweight robotic vehicle. For example, when operating on hard surface, the deflector may be displaced downward to provide a strongly curved peaked area to enable tight turning. When operating on a soft surface, the deflector may be displaced upward to provide a flatter ground-engaging area to maximize traction. Optionally, track tensioning components (not shown) can be included to maintain proper tension of the endless track as the deflector is moved up or down. The hydraulic cylinder is capable of generating enough force to enable supporting the full weight of the lightweight robotic vehicle. For example, for a lightweight robotic vehicle which weighs 20 pounds (or less), downward deflector force of 20 pounds (or more) is sufficient to allow the full weight of the lightweight robotic vehicle to be carried by the peaked area of the track. Since the deflector is capable of supporting the full weight of the lightweight robotic vehicle, it will be appreciated that heavier vehicles require a more robust deflector design. Accordingly, it is expected that lightweight robotic vehicles are more adaptable to embodiments of the present invention than large, heavy vehicles. More particularly, while many different deflector configurations will be suitable for supporting a lightweight robotic vehicle, a single deflector capable of supporting a large tank, for example, appears somewhat impractical.

Figure 4:
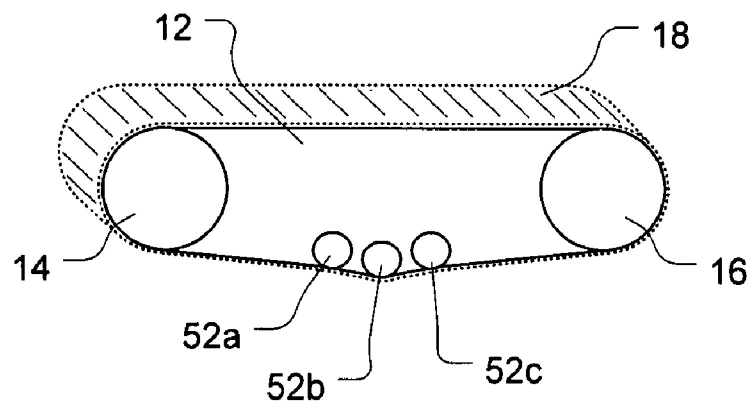
FIG. 4 illustrates a side view of a suspension system for mounting a flexible endless track according to yet another exemplary embodiment of the present invention.

In accordance with another embodiment of the present invention, as illustrated in FIG. 4, a suspension system 50 can include multiple deflectors 52*a*, 52*b*, 52*c* coupled to the frame 12. The multiple deflectors downwardly deflect the ground-engaging portion of the endless track to form the peaked area into a curved shape. Multiple deflectors can provide various different profiles, allowing the detailed shape of the peaked area to be optimized for particular environments. For example, multiple moveable deflectors can be used to dynamically vary the shape of the peaked area during operation, as well as adjust the vertical orientation, or pitch, of the lightweight robotic vehicle. Multiple deflectors can also provide some benefit in allowing the load of the lightweight robotic vehicle to be distributed over multiple components. As discussed above, the deflectors can include load-sensing elements. Operation of the deflectors may be modified based on measurements obtained from the load-sensing elements.

Figure 5:
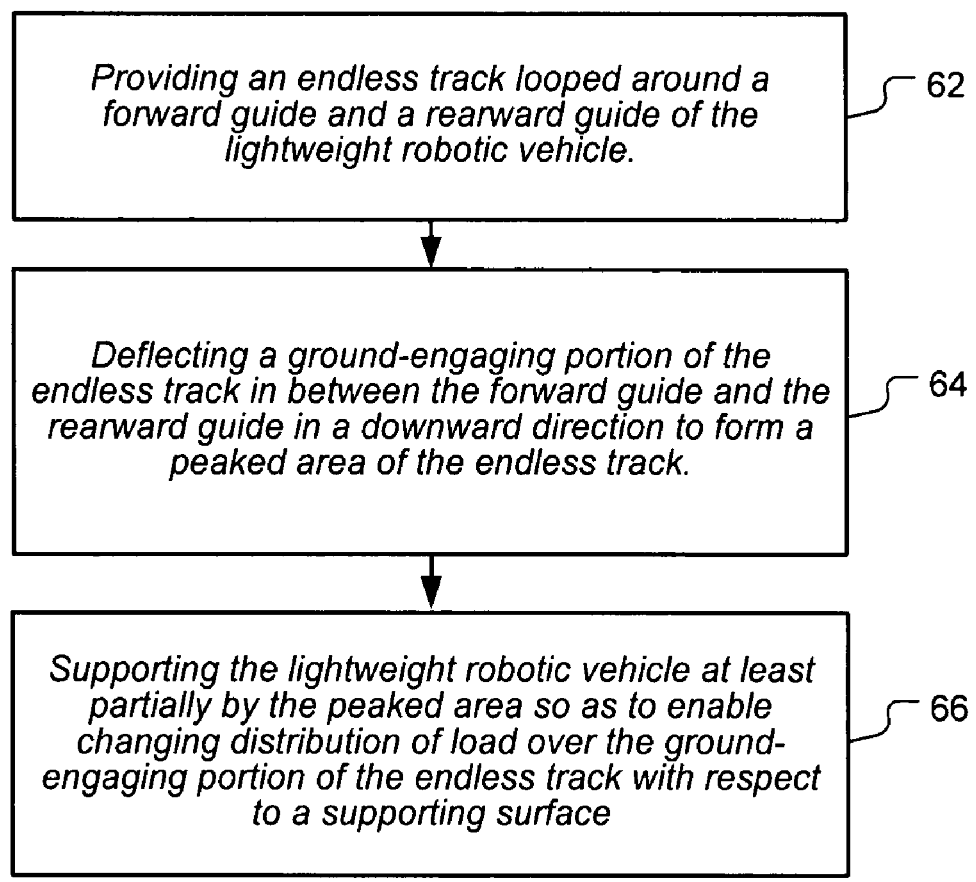
FIG. 5 illustrates a flow diagram of a method for supporting a lightweight robotic vehicle on an endless track according to an embodiment of the present invention.

In accordance with another embodiment of the present invention, as illustrated in FIG. 5, a method for supporting a lightweight robotic vehicle on an endless track is shown in flow diagram form. The method, shown generally at 60, includes providing 62 an endless track looped around a forward guide and a rearward guide of the lightweight robotic vehicle. For example, various examples of suspension systems having a forward guide and a rearward guide are discussed above. The method also includes deflecting 64 a ground-engaging portion of the endless track between the forward guide and the rearward guide in a downward direction to form a peaked area of the endless track. Various examples of deflectors are discussed above. Finally, the method includes supporting 66 the lightweight robotic vehicle at least partially by the peaked area so as to enable changing distribution of load over the ground-engaging portion of the endless track with respect to a supporting surface. For example, the lightweight robotic vehicle can be balanced on the peaked area as discussed above. As another example, the lightweight robotic vehicle can be pivoted on the peaked area to provide a short or zero radius turn.

Optionally, as discussed above, the method can include operating the lightweight robotic vehicle on a firm surface such that the peaked area of the endless track supports substantially all of the weight of the lightweight robotic vehicle. This can help to provide short radius turns. In addition, as discussed above, the method can include operating the lightweight robotic vehicle on a soft surface such that the weight of the lightweight robotic vehicle is distributed over the ground-engaging portion of the endless track. This can help to provide high traction.

The method can also include coupling the lightweight robotic vehicle to a second lightweight robotic vehicle, for example as described above. Operation of the coupled lightweight robotic vehicles can be coordinated to maintain one (or both) of the lightweight robotic vehicles balanced on the peaked area.

Finally, the method can also include moving the deflector up or down. For example, moving the deflector down can create a more strongly peaked area of the endless track to provide for shorter turning radius. Moving the deflector up can create a more flat ground-engaging portion of the endless track to provide for better traction.

Summarizing and reiterating to some extent, various endless track suspension system configurations have been described which provide various benefits over the prior art. For example, deflecting a portion of the ground-engaging surface of the endless track to form a peaked area can provide a tight turning radius for a lightweight robotic vehicle operated over a firm surface. Multiple and/or moveable deflectors can be included to allow varying the shape of the peaked area. A lightweight robotic vehicle using an embodiment of the present invention can provide improved turning radius without sacrificing the traction benefit provided by the large ground-engaging portion of an endless track.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present: a) "means for" or "step for" is expressly recited in that limitation; b) a corresponding function is expressly recited in that limitation; and c) structure, material or acts that support that function are described within the specification. Accordingly, the scope of the invention should be determined solely by the appended claims and their legal equivalents, rather than by the descriptions and examples given above.

What is claimed is:

1. A suspension system for a lightweight robotic vehicle having tandem tracks, the suspension system comprising:

a frame;

a forward guide coupled to the frame and configured to receive a looped portion of a first endless track around the forward guide;

a rearward guide coupled to the frame and configured to receive a looped portion of the first endless track around the rearward guide; and at least one deflector operable with the frame between the forward guide and the rearward guide, the at least one deflector being configured to downwardly deflect a ground-engaging portion of the first endless track between the forward guide and the rearward guide to form a peaked area, whereby the lightweight robotic vehicle is selectively stabilized on the peaked area of the first endless track and a peaked area of a second endless track associated in tandem with the first endless track by an articulated arm.

2. The system of claim 1, wherein the at least one deflector is in a fixed position relative to at least one of the forward guide and the rearward guide.

3. The system of claim 1, wherein the forward guide and the rearward guide are coupled to the frame in a fixed relative position.

4. The system of claim 1, wherein the forward guide and the rearward guide are each rollers.

5. The system of claim 1, wherein the at least one deflector is a roller.

6. The system of claim 1, further comprising a plurality of deflectors coupled to the frame in positions between the forward guide and the rearward guide and configured to downwardly deflect the ground-engaging portion of the first endless track to form the peaked area into a curved shape.

7. The system of claim 1, wherein the deflector is configured to support the lightweight robotic vehicle when the weight of the lightweight robotic vehicle is less than 20 pounds.

8. The system of claim 1, further comprising a second frame in support of the second endless track, the second frame comprising a forward guide and a rearward guide coupled to the second frame and configured to receive respective looped portions of the second endless track.

9. The system of claim 8, wherein the second frame comprises at least one deflector between the forward guide and the rearward guide, the at least one deflector being configured to downwardly deflect a ground-engaging portion of the second endless track between the forward guide and the rearward guide to form a peaked area on the second endless track.

10. The system of claim 9, wherein the deflectors of the frame and the second frame are selectively engageable to simultaneously support both vehicle frames at partially on their respective peak areas.

11. The system of claim 1, wherein the articulated arm is actuated, and provides actuated rotational movement about a longitudinal axis and bending movement about two different lateral axes.

12. A method for supporting a lightweight robotic vehicle on tandem endless tracks, comprising:

providing a first endless track looped around a forward guide and a rearward guide of the lightweight robotic vehicle;

selectively deflecting at least one ground-engaging portion of the first endless track in between the forward guide and the rearward guide in a downward direction to form a peaked area of the first endless track; and stabilizing the lightweight robotic vehicle at least partially on the peaked area of the first endless track and a peaked area of a second endless track associated in tandem with the first endless track by an articulated arm, so as to enable changing distribution of load over the ground-engaging portion of the first endless track with respect to a supporting surface.

13. The method of claim 12, further comprising operating the lightweight robotic vehicle on a firm surface such that the peaked areas of the first and second endless tracks support substantially all the weight of the lightweight robotic vehicle.

14. The method of claim 12, further comprising operating the lightweight robotic vehicle on a soft surface such that the weight of the lightweight robotic vehicle is distributed substantially over the ground-engaging portions of the first and second endless tracks.

15. The method of claim 12, further comprising:

coupling the lightweight robotic vehicle to a second lightweight robotic vehicle; and coordinating operation of the lightweight robotic vehicle with the second lightweight robotic vehicle to maintain the lightweight robotic vehicle balanced on the peaked areas.

16. The method of claim 12, further comprising selectively deflecting the ground-engaging portion along a vertical axis to vary a degree of curvature of the peaked area of the first endless track.

17. The method of claim 12, further comprising moving the deflector in an upward direction to create a flat ground-engaging portion of the first endless track.

18. The method of claim 12, further comprising:

selectively deflecting the ground-engaging portion of the first endless track and a ground engage portion of the second endless track in a downward direction to form peaked areas of both the first and second endless tracks; and coordinating operation of the endless tracks to maintain the vehicle balanced on the peaked areas.

19. The method of claim 12, wherein the articulated arm is actuated, and provides actuated rotational movement about a longitudinal axis and bending movement about two different lateral axes.

* * * * *